(12) United States Patent
Cai

(10) Patent No.: US 6,678,890 B1
(45) Date of Patent: Jan. 13, 2004

(54) BIDIRECTIONAL TRANSMISSION/RECEPTION SYSTEM AND METHOD AND TRANSMISSION APPARATUS

(75) Inventor: Kaili Cai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/520,485

(22) Filed: Mar. 8, 2000

(30) Foreign Application Priority Data

Mar. 10, 1999 (JP) .......................................... 11-063826

(51) Int. Cl.$^7$ .......................... H04N 7/16; H04N 7/173; H04H 9/00; G06F 17/00; G06F 19/00
(52) U.S. Cl. .............................. 725/24; 725/14; 725/22; 725/23; 725/131; 463/40
(58) Field of Search .......................... 725/131, 24, 14, 725/23, 22; 463/40

(56) References Cited

U.S. PATENT DOCUMENTS

| | | | | |
|---|---|---|---|---|
| 5,363,433 A | * | 11/1994 | Isono | 370/390 |
| 5,539,822 A | * | 7/1996 | Lett | 380/211 |
| 5,880,720 A | * | 3/1999 | Iwafune et al. | 725/24 |
| 5,936,661 A | * | 8/1999 | Trew | 725/114 |
| 6,513,160 B2 | * | 1/2003 | Dureau | 725/9 |

* cited by examiner

Primary Examiner—John Miller
Assistant Examiner—Johnny Ma
(74) Attorney, Agent, or Firm—Frommer Lawrence & Haug LLP; William S. Frommer; Hans R. Mahr

(57) ABSTRACT

A system and a method for bidirectional transmission/reception in which the information aired in e.g., television broadcast can be received with a high probability to permit a sponsor to readily comprehend the state of reception. A collective information generating system 5 includes temporary reply recovery device $13_1, \ldots, 13_m$ for recovering the response data sent from the transmission/reception device 2 over a transmitting network 6, a quiz response recovery unit 14 and a CPU 15 having the information generating function of generating the lottery result information based on the response data recovered by the quiz response recovery unit 14. The lottery result information generated by the collective information generating system 5 is multiplexed by the multiplexing broadcast encoder 11 and transmitted to the transmission/reception unit 2 by a broadcast transmission device 12.

24 Claims, 4 Drawing Sheets

BIDIRECTIONAL TRANSMISSION/ RECEPTION SYSTEM AND METHOD AND TRANSMISSION APPARATUS

BACKGROUND OF THE INVENTION

1. Field of the Invention

This invention relates to a system and a method for bidirectional transmission/reception used for data transmission/reception, and a transmission apparatus. More particularly, it relates to the system and method for bidirectional transmission/reception used for data transmission/ reception, and the transmission apparatus, which may be used with advantage in television broadcast for airing the program information or the information for commercial advertisements as broadcast program.

2. Description of the Related Art

As transmission means for variable information, there is the television broadcast retained to be of a so-called broadcast type. In television broadcast, a broadcasting station distributes the program information or the commercial advertisement information by having the information carried on the broadcast signals by a transmission apparatus. The subscribers receive the distributed broadcast signals by receivers so as to be purveyed with the program or the commercial advertisements in the received program. For example, the subscribers are supplied with the information on new products, for example, by the commercial advertisements. The suppliers of the commercial advertisements, referred to below as sponsors, acquire commercial profits from their good impressions created by these commercial advertisements. Here, the commercial advertisements are retained to be subsidiary to the ordinary programs.

Meanwhile, in the information transmission exploiting the television broadcast, the information is purveyed unidirectionally from the broadcasting station or the sponsor. As means for acquiring the response to the commercial advertisements from the viewers, it may be contemplated to conduct a campaign for new products in the commercial advertisements such as by presenting a commercial product to the viewer who replied to a quiz by a postcard or telephone to check the audience rate of the commercial advertisements. This, however, takes much time until the audience rate of or the general response to the commercial advertisements can be comprehended completely. On the other hand, there are occasions wherein the viewer is desirous to know immediately whether or not the or she has responded to the quiz correctly and acquired the prize, such that, if the response is comprehended by the sponsor only after prolonged time, the number of participants to the quiz would be small. Moreover, it is cumbersome for the viewer to write a postcard or phone. That is, the above-described conventional means for participation in a campaign held by the sponsor tends to frustrate the intention of the viewers to take part in it, while only a marginal publicizing effect is achieved by the commercial advertisements.

Moreover, if a campaign is introduced by a commercial advertisement to check the response, the viewer is not necessarily viewing the commercial advertisement. For example, if a commercial advertisement is aired within the time of a program having a high audience rate, there are occasions wherein the viewer switches the channel to view other programs or to do other things than viewing the commercial advertisement. In such case, it cannot be checked how many viewers are viewing the commercial advertisement such that the response to the commercial advertisement cannot be checked effectively. In addition, if the viewer switches the channel during the time of airing the commercial advertisement to view other programs, the commercial advertisement itself leads to the lowering of the audience rate of the program.

The conventional practice also has been to air the commercial advertisements in the programs enjoying a high audience rate with an intention of improving the publicizing effect of the commercial advertisements. That is, the commercial advertisement by itself is unable to raise the audience rate, such that, if the publicizing effect of the commercial advertisement is to be improved, the sponsor has to set the airing time zone for the commercial advertisement based on the audience rate of the program in order to have the commercial advertisement aired in the program enjoying a high audience rate.

SUMMARY OF THE INVENTION

It is therefore an object of the present invention to provide a system and a method for bidirectional transmission/ reception used for data transmission/reception, and a transmission apparatus, in which the information aired by e.g., television broadcast is received at a high probability to permit the sponsor to grasp the results of the reception more readily.

In one aspect, the present invention provides a bidirectional transmission/reception system including a transmission device having multiplexing means for multiplexing the response request information requesting the response from a subscriber who has received the broadcast signals on broadcast signals, a reception device having receiving means for receiving the broadcast signals transmitted from the transmission device and transmission means for outputting the broadcast signals transmitted by the transmitting device and transmitting means for outputting the broadcast signals received by this reception means and the response request information to audio/video outputting means and for transmitting over a transmitting network response data inputted by the audience responsive to the response request information outputted to the audio/video outputting means, and a collective information generating device having response data recovery means for recovering the response data transmitted by the transmitting network and information generating means for generating the collective information based on the response data recovered by the response data recovery means, the transmission device multiplexes the collective information downstream of the response request information of the broadcast signals by the multiplexing means.

In this bidirectional transmission/reception system, the broadcast signals having the response request information multiplexed therein by multiplexing means of the transmission device are transmitted by the transmitting means. The reception device outputs the response request information in the broadcast signals received by the receiving means to the audio/visual outputting means to transmit the response data by the subscriber over the transmission circuit to the collective information generating device. The collective information generating device formulates the collective information of the response data based on the response data recovered by the response data recovery means. The collective information generating device formulates the collective information of the response data based on the response data recovered by the response data recovery means. The transmission device multiplexes the collective information downstream of the broadcast signals to transmit the multiplexed data to the reception device.

By so doing, the information aired in e.g., television broadcast is received with a high probability, whilst the sponsor is able to comprehend the results of reception easily.

In another aspect, the present invention provides a bidirectional transmission/reception method including a transmission step of multiplexing the response request information requesting the response from a subscriber who has received the broadcast signals on broadcast signals for transmitting the broadcast signals having the response request information multiplexed thereon, a reception and transmission step for receiving the broadcast signals transmitted from the transmission device, outputting the transmitted broadcast signals and transmitting means for outputting the broadcast signals received by this reception means and transmitting the response request information to audio/video outputting means and for transmitting over a transmitting network response data inputted by the audience responsive to the response request information outputted to the audio/video outputting means, and a collective information generating step for recovering the response data transmitted by the transmitting network and for generating the collective information based on the response data recovered by the response data recovery means, the transmission step multiplexes the collective information downstream of the response request information of the broadcast signals.

With the present bidirectional transmission/reception method, the response request information multiplexed on the broadcast signals by the transmission step is received by the subscriber. The response data from the subscriber, inputted in association with the response request information outputted to the audio/visual output means, is transmitted to the transmission network. The collective information is formulated based on the response data recovered from the transmission network and is multiplexed downstream of the response request information of the broadcast signals for transmission to the subscriber.

By so doing, the information aired in e.g., television broadcast is received with a high probability, whilst the sponsor is able to comprehend the results of reception readily.

In yet another aspect, the present invention provides a transmission apparatus including multiplexing means for multiplexing the response request information requesting a response from a subscriber who has received broadcast signals on the broadcast signals, transmission means for transmitting the broadcast signals multiplexed with the response request information, response data recovery means for recovering response data of the subscriber transmitted over the transmission network, the response data being generated in association with the response supply information in the broadcast signals outputted to the audio/visual outputting means on reception of the broadcast signals transmitted by the transmission means; and information generating means for generating the collective information based on the response data recovered by the response data recovery means. The multiplexing means multiplexes the collective information downstream of the response request information of the broadcast signals.

In such transmission apparatus, the broadcast signals, multiplexed with the response request information by the multiplexing means, are transmitted by the transmission means. The transmission apparatus recovers, over the transmission network, the response data inputted by the subscriber receiving the broadcast signals by a receiver in association with the response request information in the broadcast signals outputted to the audio/visual outputting means. The transmission apparatus generates the collective information of the response data by information generating means based on the recovered response data. The transmission apparatus multiplexes the collective information downstream of the recording and/or reproduction of the broadcast signals to transmit the resulting multiplexed data to the receiver. By so doing, the broadcast signals, multiplexed with the response request information by the multiplexing means, are transmitted, whilst the subscriber, receiving the broadcast signals by e.g., a receiver, recovers the response data inputted by the subscriber in reply to the response request information in the broadcast signals outputted to the audio/visual outputting means, by response data recovery means. Also, the collective information of the response data is formulated by the information generating means based on the recovered response data and is multiplexed downstream of the response request information of the broadcast signals. The multiplexed data is returned to the subscriber.

Also, in this manner, the information aired in e.g., television broadcast is received with a high probability, whilst the sponsor is able to comprehend the results of reception readily.

DESCRIPTION OF THE PREFERRED EMBODIMENTS

Figure 1:
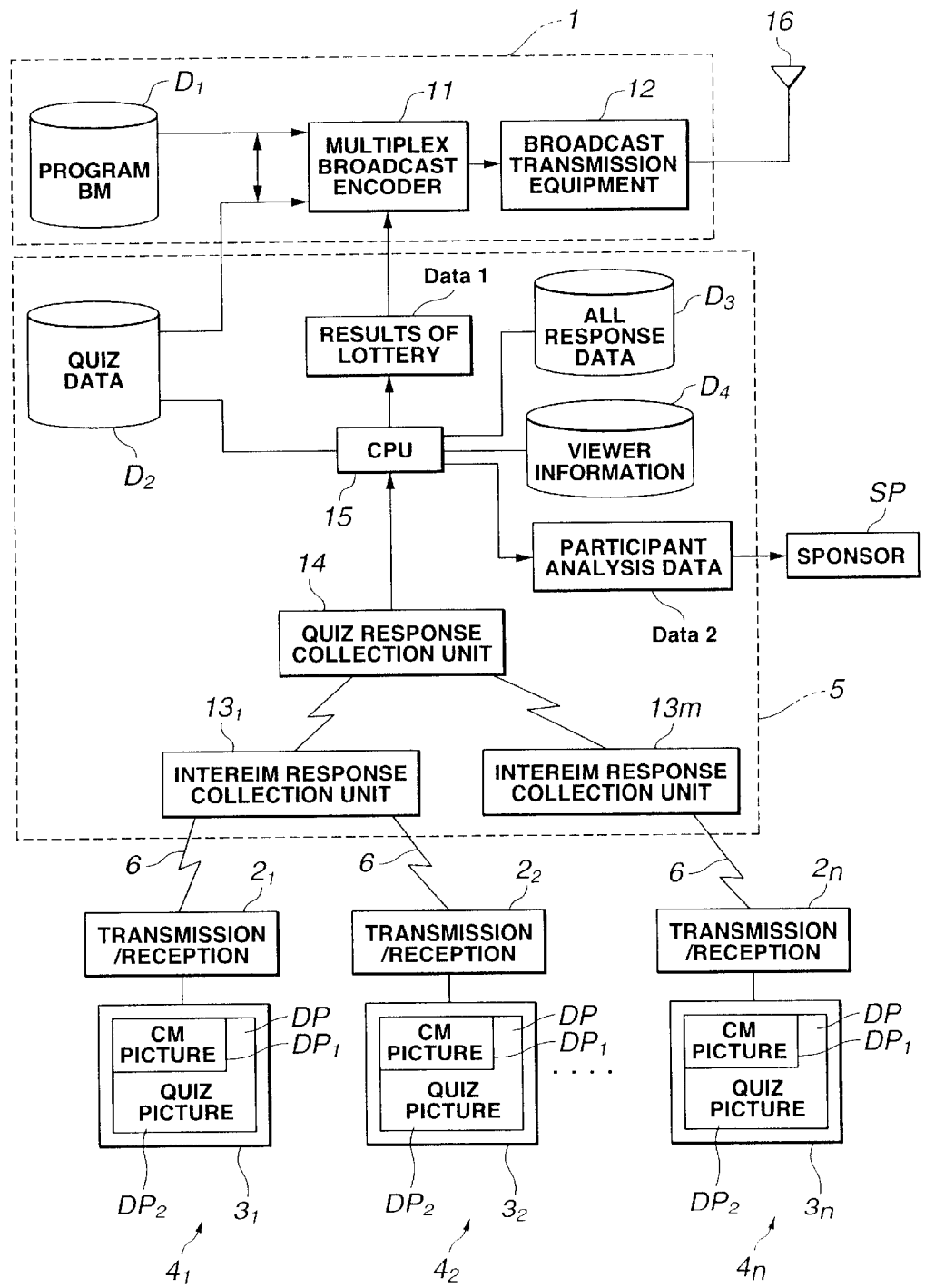
FIG. 1 is a block diagram showing the structure of a television broadcast system embodying the present invention.

Referring to the drawings, preferred embodiments of the present invention will be explained in detail. In the illustrated embodiment, the bidirectional transmission/reception system according to the present invention is applied to a television broadcast system for program broadcasting or commercial advertisement broadcasting.

Referring to FIG. 1, a television broadcast system includes a transmission device 1 for airing broadcast data, a broadcast reception units $4_1, 4_2, \ldots, 4_4$ and a collective information generating system 5 having the function of collecting response data from the broadcast reception units $4_1, 4_2, \ldots, 4_4$ and generating the sum information. The broadcast reception units $4_1, 4_2, \ldots, 4_4$ are provided with transmission/reception devices $2_1, 2_2, \ldots, 2_n$ for receiving broadcast signals aired from the transmission device 1 and for outputting programs and the commercial advertisements on the screen based on the broadcast signals received by the transmission/reception devices $2_1, 2_2, \ldots, 2_n$.

The transmission device 1 includes a multiplexing broadcast encoder 11, as means for multiplexing the quiz information as the response request information requesting the subscriber receiving the broadcast signals to make a response and a broadcast reception device 12 as means for transmitting broadcast signals on which the quiz information is multiplexed by the multiplexing broadcast encoder 11. The transmission device 1 also has a function of multiplexing the collective information on the broadcast signals in a portion downstream of the response request information.

The broadcast reception units $4_1, 4_2, \ldots, 4_4$ collectively termed a broadcast reception unit 4, are provided with transmission/reception devices $2_1, 2_2, \ldots, 2_n$, collectively termed a transmission/reception unit 2. The transmission/reception unit 2 has the function of receiving data sent from the transmission device 1, and the function of outputting the program information, commercial advertisement information and the quiz information in the broadcast signals received by the reception function to television receivers $3_1$, $3_2, \ldots, 3_n$, as audio/video outputting means for outputting the speech and/or the picture, collectively termed a television receiver 3, and of transmitting the response data furnished by the subscriber responsive to the quiz information outputted to the television receiver 3 over a transmission network.

The collective information generating system 5 includes temporary response recovery devices $13_1, \ldots, 13_m$ and the quiz response recovery unit 14, as recovered data recovery means for recovering response data sent over the transmission network 6, and a CPU 15 having the function of generating the collective information based on the response data recovered by the quiz response recovery unit 14. For example, the collective information generating system 5 and the aforementioned transmission device 1 are constituted in a broadcasting station providing the television broadcast.

The above-described components are hereinafter explained in detail in the sequence of the transmission/reception processing of the broadcast signals.

The transmission device 1 generating the broadcast signals multiplexes the quiz information recorded on recording means $D_2$ on the broadcast information made up of the program information and the commercial advertisement information recorded on recording means $D_1$ by the multiplexing broadcast encoder 11. As for multiplexing, the multiplexing broadcast encoder 11 multiplexes the quiz information in association with the commercial advertisement information in synchronization between the commercial advertisement information and the quiz information. The program information is a broadcast material furnished by the broadcasting station to the viewer (subscribers), whist the commercial advertisement information is the information aired within the program airing time and consists of the advertisement information offered by the sponsor to the subscriber.

The broadcast signals, multiplexed with the quiz information by the multiplexing broadcast encoder 11, are processed in the broadcast reception device 12 with signal processing for broadcasting, such as modulation, and transmitted from an antenna 16.

The broadcast reception unit 4 receives broadcast signals aired from a broadcasting station. A transmission/reception device 2 is e.g., a so-called cable box for cable television or a so-called set-top box, such as a tuner of a teletext. Specified examples of the transmission/reception device 2 will be explained subsequently.

This transmission/reception device 2 demodulates the received broadcast signals. The program, commercial advertisements and the quiz information are outputted as speech and/or picture on a screen DP of the television receiver 3.

Specifically, the quiz information is presented as a query pertinent to the commercial. For example, the quiz information $DP_2$ is synthesized to a commercial picture $DP_1$ and outputted as a sole picture on the screen DP of the television receiver 3. The synthesis in the transmission/reception device 2 will be explained in detail subsequently.

The transmission/reception device 2, having the function of performing the processing of outputting the quiz information $DP_2$ on the screen DP of the television receiver 3, also is configured for being fed with response data by the viewer as subscriber. For example, the transmission/reception device 2 acquires the response from the subscribed as response data of the subscriber as a result of actuation of a remote controller as remote control means. For example, the transmission/reception device 2 acquires the correct or mistaken reply to the quiz made by the participant in the quiz which was presented in the commercial advertisement.

The response data acquired by the transmission/reception device 2 is outputted from the transmission/reception device 2 over the transmitting network 6 to temporary reply recovery devices $13_1, \ldots, 13_n$ of the collective information generating system 5, collectively referred to below as an temporary reply recovery device 13. For example, the transmission/reception device 2 transmit response data as data packets as it stores the ID number of the device.

For example, if the transmission/reception device 2, which is a so-called set top box, is used as a reception equipment of the cable television or satellite CS broadcasting, a device ID of the transmission/reception device 2 is supervised on the side of the broadcasting station in association with the registration information of the audience. The transmission/reception device 2 appends the device ID, associated in this manner with the registration information of the audience, to the response data to output the resulting data to the temporary reply recovery device 13.

The transmitting network 6, interconnecting the transmission/reception device 2 and the temporary reply recovery device 13, is e.g., a public telephone network in general or a dedicated cable network etc capable of performing data transfer etc.

The transmission/reception device 2 is not limited to the aforementioned set top box, such that it may also be enclosed as-one in the television receiver 3.

The temporary reply recovery device 13 temporarily recovers the response data sent from the transmission/reception devices $2_1, 2_2, \ldots, 2_n$ of the broadcast reception units $4_1, 4_2, \ldots, 4_n$. The response data recovered by this temporary reply recovery device 13 is ultimately recovered by the quiz response recovery unit 14. The response data is transmitted from the temporary reply recovery device 13 to the quiz response recovery unit 14 by the temporary reply recovery device 13 after lapse of a predetermined time transmitting the recovery data to the quiz response recovery unit 14 collected up to the transmitting time. Specifically, the temporary reply recovery device 13 completes the recovery of the response data after the end of the commercial broadcasting to output the response data transmitted up to the time of recovery end to the quiz response recovery unit 14.

The temporary reply recovery device 13 is configured as a lower-order response data recovery unit with respect to the quiz response recovery unit 14. That is, the quiz response recovery unit 14 and the temporary reply recovery devices $13_1, \ldots, 13_n$ constitute response data recovery means for recovering response data by a hierarchical structure. By designing the response data recovery means as a hierarchical structure and providing the temporary reply recovery device 13 between the broadcast reception units $2_1, 2_2, \ldots, 2_n$ and the quiz response recovery unit 14, response data from the broadcast reception units $4_1, 4_2, \ldots, 4_n$ may be prohibited from being directly transmitted at a time to the quiz response recovery unit 14. This prevents the processing by the quiz response recovery unit 14 from becoming impossible to relieve the load.

The CPU 15 formulates the collective information etc based on the response data transmitted from the temporary reply recovery device 13 and collected by the quiz response recovery unit 14. For example, the CPU 15 extracts a pre-set number of response data from the plural response data collected by the quiz response recovery unit 14 to generate the lottery result information as the collective information based on the extracted response data and the previously acquired audience information concerning the subscribers. Specifically, the CPU compares the totality of the recovered response data and the correct reply to the quiz to formulate a list of the subscribers who made and transmitted the correct response. The lottery is then performed on the list of the subscribers who made and transmitted the correct response to formulate the lottery result information listing up a re-set number of winners (information on the winners).

The response data are recorded by the CPU 15 on recording means $D_3$. Meanwhile, the recording means D3 is also able to record the response data collected so far.

The lottery result information is the audience information constituted by the information such as the name and the address of the subscribers who made the response and subjected to the lottery. Specifically, the lottery result information is the information generated by having reference to the information previously held in recording means $D_4$ as the information concerning the audience by the collective information generating system 5.

The previously acquired audience information includes, in addition to the registered information of the audience, such as names and addresses of the audience, the ID numbers of the transmission/reception devices 2 owned by the audience. In this manner, the CPU 15 is able to acquire the names and the addresses of the audience as the lottery result information based on the ID numbers affixed to the response data subjected to the lottery.

The lottery result information, thus formulated by the CPU 15, is multiplexed and aired by the multiplexing broadcast encoder 11. The lottery result information Data1 is multiplexed downstream of the quiz information for which the lottery result information Data1 is formulated. Therefore, in the broadcast reception unit 4, the lottery result information Data1, transmitted by the broadcast signals, is outputted on the screen DP of the television receiver 3 after the quiz information. For example, the result of the lottery are displayed on the screen DP in the form of annunciation of the winners made in the commercial advertisements again aired after outputting the quiz information.

The lottery from the audience who made correct response may be made at once on taking the sum of the response data. Alternatively, it may be made after lapse of a pre-set time or in plural installments. The lottery result information may be annunciated immediately after the lottery, or on the occasion of the next commercial advertisements.

As the lottery result information is aired in this manner, the broadcasting station analyses the audient who transmitted response data to the quiz information, that is the participants in the quiz, in a number of ways. The broadcasting station furnishes the result of analysis as participant analysis data Data2 to the sponsor SP of the commercial advertisements who presented the quiz.

With the above-described television broadcasting system, the information aired in the television broadcasting is received with a high probability to permit the broadcasting station or the sponsor as the transmitting side to grasp the state of reception easily.

By this television broadcasting system, it is possible in the television broadcast to supply the advertisement request information requesting the response to the quiz information in association with the program broadcasting or commercial advertisements. The subscriber can transmit the response data to the quiz information thus supplied so that the sponsor is able to acquire the response of the subscriber to the furnished information. For example, the sponsor is able to acquire the information concerning the subscriber receiving the commercial advertisements. Since the response data can be instantaneously processed by the collective information generating system 5, there is no necessity of performing time-consuming operation for generating the useful information such as is required in the conventional practice. On the other hand, the interest of the subscriber in the commercial advertisements is aroused by addition of the response requesting information to the commercial advertisements.

Figure 2:
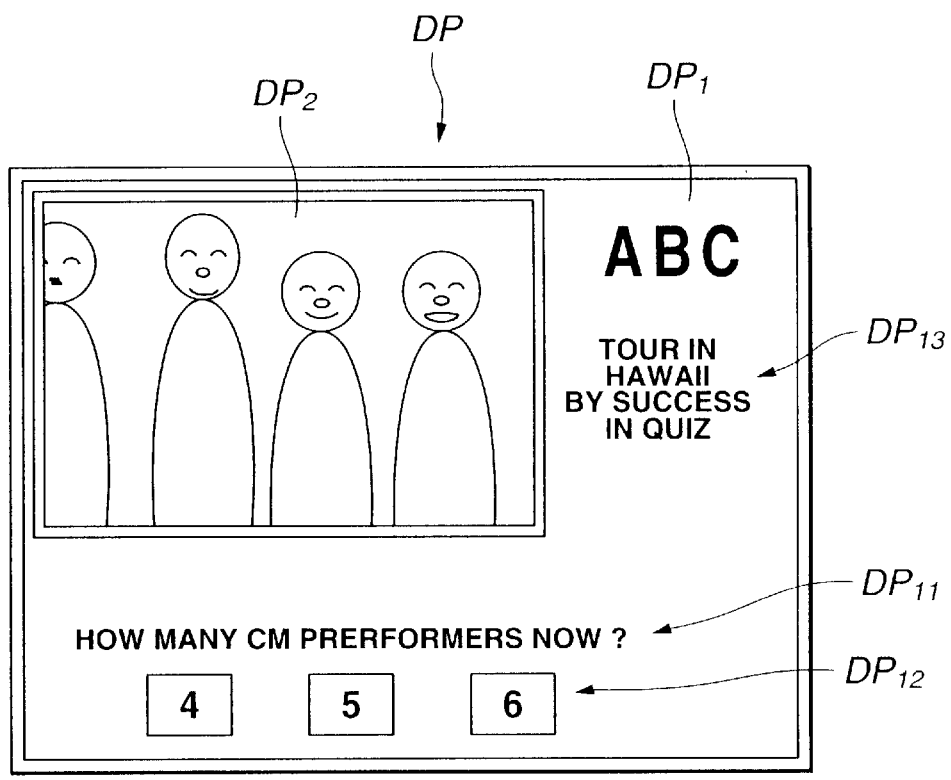
FIG. 2 is a front view showing how the quiz information is synthesized in an image of a commercial advertisement and aired.

The outputting in the broadcast reception units 2 and the inputting of the response data are hereinafter explained specifically FIG. 2 shows an example of a commercial advertisement, with a quiz, outputted on the screen DP of the television receiver 3. In this example, a query is made to performers in the commercial advertisement. In FIG. 2, a commercial picture "ABC" by a cosmetics company as a sponsor is outputted as the commercial advertisement picture $DP_2$. A query $DP_{11}$ such as "how many performers are there on the present commercial advertisement?", an alternative $DP_{12}$ as the response to this query and the information $DP_{13}$ on articles which the audience may acquire on making a correct reply to this query. For example, the commercial advertisement picture $DP_2$ is a speedily changing picture of dancing performers. The audience makes a response, using e.g., a remote controller, to the query such as "how many performers are there on the present commercial advertisement?". The transmission/reception unit 2 prepares response data in association with the remote-controller operation by the audience.

By presenting the quiz relevant to the commercial advertisement $DP_2$ in this manner, the audience views the commercial advertisement, as if the or she is playing a game, without feeling reluctant. This raises the audience rate of the commercial advertisements to improve advertizing effect by the commercial advertisements.

By the audience simply and readily taking part in the quiz annexed to the commercial advertisements, the audience is able to take part easily in the quiz of the commercial advertisement to raise the audience rate of the commercial advertisements to effectively improve the advertizing effect by the commercial advertisements.

If the quiz is of such a nature that the response thereto cannot be derived instantly but can be derived only on viewing the commercial advertisement from its beginning to its end, that is if the response to the quiz is hidden at an optional time of the commercial advertisement, the audience is obliged to view the commercial advertisement in a concentrated manner. This again raises the audience rate of the commercial advertisements to improve advertizing effect by the commercial advertisements.

Also, the time during which a commercial advertisement is aired in television broadcast is usually 15 or 30 sec. It is not necessarily possible for the audience to find a response to the quiz. That is, because of the short duration of the commercial advertisements, the audience views the commercial advertisement at least twice in most cases. This similarly raises the audience rate of the commercial advertisements to improve advertizing effect by the commercial advertisements.

The response data obtained from the audience as the reply to the quiz also permits the analysis of the information concerning the audience, such that the sponsor is able to quantitatively comprehend the advertizing effect by the commercial advertisements based on the number of the audience who participated in the quiz. Moreover, the sponsor is able to class the audience according to their age, sex or the like to extract the marketing information of the audience, such as distribution. For example, the age, sex etc of the consumers of the article aired in the commercial advertisement can be acquired as the marketing information.

Figure 3:
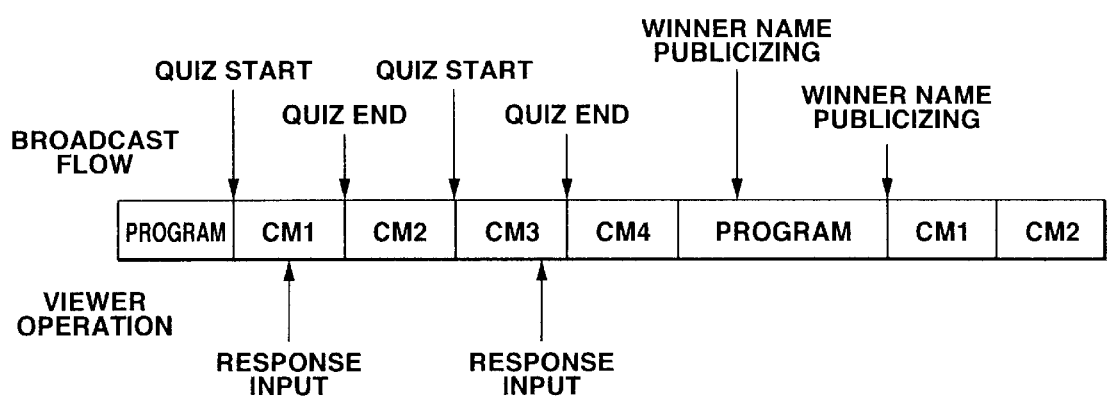
FIG. 3 shows time flow of airing of programs, commercial advertisements and the quiz.

FIG. 3 shows the time flow for outputting the program, commercial advertisements or the quiz on a screen. In the present example, the quiz information is synthesized in commercial advertisements CM1 and CM2 for display on the screen, such that the picture of the commercial advertisement and the quiz information starts to be aired simultaneously, with the quiz information coming to an end with the end of the airing of the commercial advertisement. The reply time to the quiz is limited to the airing time of the commercial advertisement aired with the quiz, such that the audience performs the response inputting within the airing time of the commercial advertisement and the quiz.

Figure 4:
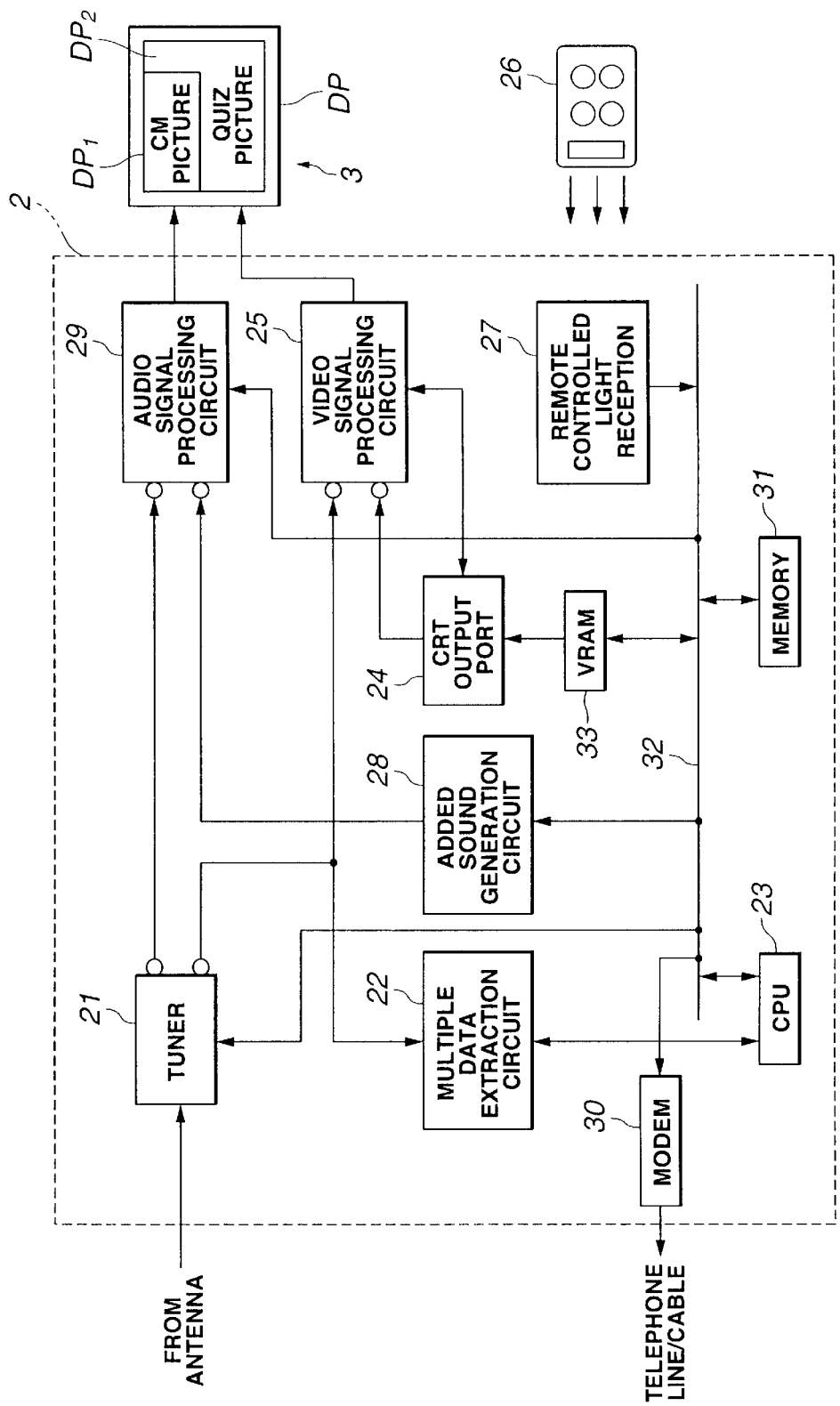
FIG. 4 is a block diagram showing a more specified structure of the transmission/reception apparatus of the television broadcast system.

FIG. 4 shows a specified stricture of the transmission/reception unit 2, which extracts the quiz information from the broadcast signals received by a tuner 21.

A CPU 23 generates a quiz response image in a pre-set layout on a video RAM (VRAM) 33 based on the extracted quiz information to transmit the quiz response image over a data bus 32 and a CRT output port 24 to a video signal processing circuit 25. Meanwhile, the memory 31 is means for storing various data.

The video signal processing circuit 25 synthesizes picture signals of the commercial advertisements with the quiz reply image to display the synthesized image on the screen DP of the television receiver 3 as a picture combined from the commercial advertisement information and the quiz information.

The audience viewing the quiz picture DP2 displayed on the screen DP finds the reply hidden in the commercial advertisement DP1 to operate a remote controller 26 to make the response to the quiz.

The transmission/reception unit 2 is also configured for outputting the speech from the television receiver 3 responsive to the actuation from the remote controller 26. Specifically, the CPU 23 senses the actuation on the remote controller 26 by a remote-controlled light receiving unit 27 to drive an additive sound generating circuit 28 to generate an additive sound. An audio signal processing circuit 29 synthesizes the additive sound signal generated by the additive sound generating circuit 28 with the speech signal of the commercial advertisements from the tuner 21. The synthesized audio signals are outputted from a speaker etc of the television receiver 3.

The CPU 23 in the transmission/reception unit 2 sets the reply by the audience and the ID number of the device into a sole data packet which is converted by a modem 30 into a transmission/reception signal for transmission to the temporary reply recovery device 13 over a communication cable 6, such as a cable.

With the above-described structure of the transmission/reception unit 2, the transmitted quiz information, multiplexed on the broadcast signals, can be outputted to the television receiver 3. Moreover, the response made by the subscriber to the quiz information is acquired as the response data which response data can be transmitted over a telephone network (public telephone network) to the aforementioned collective information generating system 5.

What is claimed is:

1. A bidirectional transmission/reception system comprising:

a transmission device having multiplexing means for multiplexing the response request information requesting the response from a subscriber who has received the broadcast signals on broadcast signals;

a reception device having receiving means for receiving the broadcast signals transmitted from said transmission device and transmission means for outputting the broadcast signals transmitted by said transmitting device and transmitting means for outputting the broadcast signals received by this reception means and the response request information to audio/video outputting means and for transmitting over a transmitting network response data inputted by the audience responsive to the response request information outputted to the audio/video outputting means; and a collective information generating device having response data recovery means for recovering the response data transmitted by said transmitting network and information generating means for generating the collective information based on the response data recovered by said response data recovery means;

said transmission device multiplexing said collective information downstream of said response request information of said broadcast signals by said multiplexing means;

wherein:
said broadcast signals include the program information and the commercial advertisements;
said response request information being a query information made up of queries relevant to the commercial advertisement information;
said information generating means extracts a pre-set number of the response data from plural response data recovered by said response data recovery means to generate a lottery result information as said collective information based on the extracted response data and on the previously acquired subscriber information for the subscribers.

2. The bidirectional transmission/reception system according to claim 1 wherein
said multiplexing means multiplexes said query information in association with the commercial advertisement information.

3. The bidirectional transmission/reception system according to claim 1 wherein
said response data recovery means recovers only the response data inputted by the subscriber within a pre-set time responsive to the response request information.

4. The bidirectional transmission/reception system according to claim 1 wherein
said response data recovery means is of a hierarchical structure having a plurality of response data recovery units adapted for recording the response data transmitted by said transmission network.

5. The bidirectional transmission/reception system according to claim 1 wherein
said transmission device multiplexes the collective information on the broadcast signals by said multiplexing means to transmit the broadcast signals multiplexed with the collective information by said transmission means.

6. The bidirectional transmission/reception system according to claim 1 wherein
said collective information generating device includes recording means for holding the response data recovered by said reply data recovery means.

7. The bidirectional transmission/reception system according to claim 6 wherein
said collective information generating device generates the subscriber information based on the recovery data recorded on said recording means.

8. The bidirectional transmission/reception system according to claim 1 wherein
said reception device includes inputting means for inputting the response data by remote control operation.

9. The bidirectional transmission/reception system according to claim 1 wherein
said transmission network is a pre-existing communication network for data transmission/reception.

10. A bidirectional transmission/reception method comprising:
a transmission step of multiplexing the response request information requesting the response from a subscriber who has received the broadcast signals on broadcast signals for transmitting the broadcast signals having the response request information multiplexed thereon;
a reception and transmission step for receiving the transmitted broadcast signals, outputting the transmitted broadcast signals and the response request information to audio/video outputting means and for transmitting over a transmitting network response data inputted by the audience responsive to the response request information outputted to the audio/video outputting means; and
a collective information generating step for recovering the response data transmitted by said transmitting network and for generating the collective information based on the recovered response data;
said transmission step multiplexing said collective information downstream of said response request information of said broadcast signals;
wherein:
said broadcast signals include the program information and the commercial advertisements;
said response request information being a query information made up of queries relevant to the commercial advertisement information;
said information generating step extracts a pre-set number of the response data from plural response data recovered by said response data recovery means to generate a lottery result information as said collective information based on the extracted response data and on the previously acquired subscriber information for the subscribers.

11. The bidirectional transmission/reception method according to claim 10 wherein
said transmission step multiplexes said query information in association with the commercial advertisement information.

12. The bidirectional transmission/reception method according to claim 10 wherein
said collective information generating step recovers only the response data inputted by the subscriber within a pre-set time in association with the response request information.

13. The bidirectional transmission/reception method according to claim 10 wherein
said transmission step transmits the broadcast signals having the multiplexed collective information within a pre-set time.

14. The bidirectional transmission/reception method according to claim 10 wherein
said collective information generating step multiplexes said collective information within a pre-set time on said broadcast signals.

15. The bidirectional transmission/reception method according to claim 10 wherein
said collective information generating step generates the subscriber information for the subscribers based on the recovered response data.

16. The bidirectional transmission reception method according to claim 10 wherein
said transmission network is the pre-existing transmission/reception communication network.

17. A transmission apparatus comprising:
multiplexing means for multiplexing the response request information requesting a response from a subscriber who has received broadcast signals on said broadcast signals;
transmission means for transmitting the broadcast signals multiplexed with the response request information;
response data recovery means for recovering response data of the subscriber transmitted over said transmission network, said response data being generated in association with the response supply information in said broadcast signals outputted to said audio/visual outputting means on reception of the broadcast signals transmitted by said transmission means; and
information generating means for generating the collective information based on the response data recovered by said response data recovery means;
said multiplexing means multiplexing said collective information downstream of the response request information of said broadcast signals;
wherein:
said broadcast signals include the program information and the commercial advertisements;
said response request information being a query information made up of queries relevant to the commercial advertisement information;
said information generating means extracts a pre-set number of the response data from plural response data recovered by said response data recovery means to generate a lottery result information as said collective information based on the extracted response data and on the previously acquired subscriber information for the subscribers.

18. The transmission apparatus according to claim 17 wherein
said multiplexing means multiplexes said query information in association with the commercial advertisement information.

19. The transmission apparatus according to claim 17 wherein
said response data recovery means recovers only the response data inputted by the subscriber within a pre-set time responsive to the response request information.

20. The transmission apparatus according to claim 17 wherein
said response data recovery means is of a hierarchical structure having a plurality of response data recovery units adapted for recording the response data transmitted by said transmission network.

21. The transmission apparatus according to claim 17 wherein said transmission device multiplexes the collective information on the broadcast signals by said multiplexing means to transmit the broadcast signals multiplexed with the collective information by said transmission means.

22. The transmission apparatus according to claim 17 further comprising:

recording means for holding the response data recovered by said reply data recovery means.

23. The transmission apparatus according to claim 22 wherein said information generating device generates the subscriber information based on the recovery data recorded on said recording means.

24. The transmission apparatus according to claim 17 wherein said transmission network is a pre-existing data transmitting/receiving communication network.

* * * * *